UNITED STATES PATENT OFFICE.

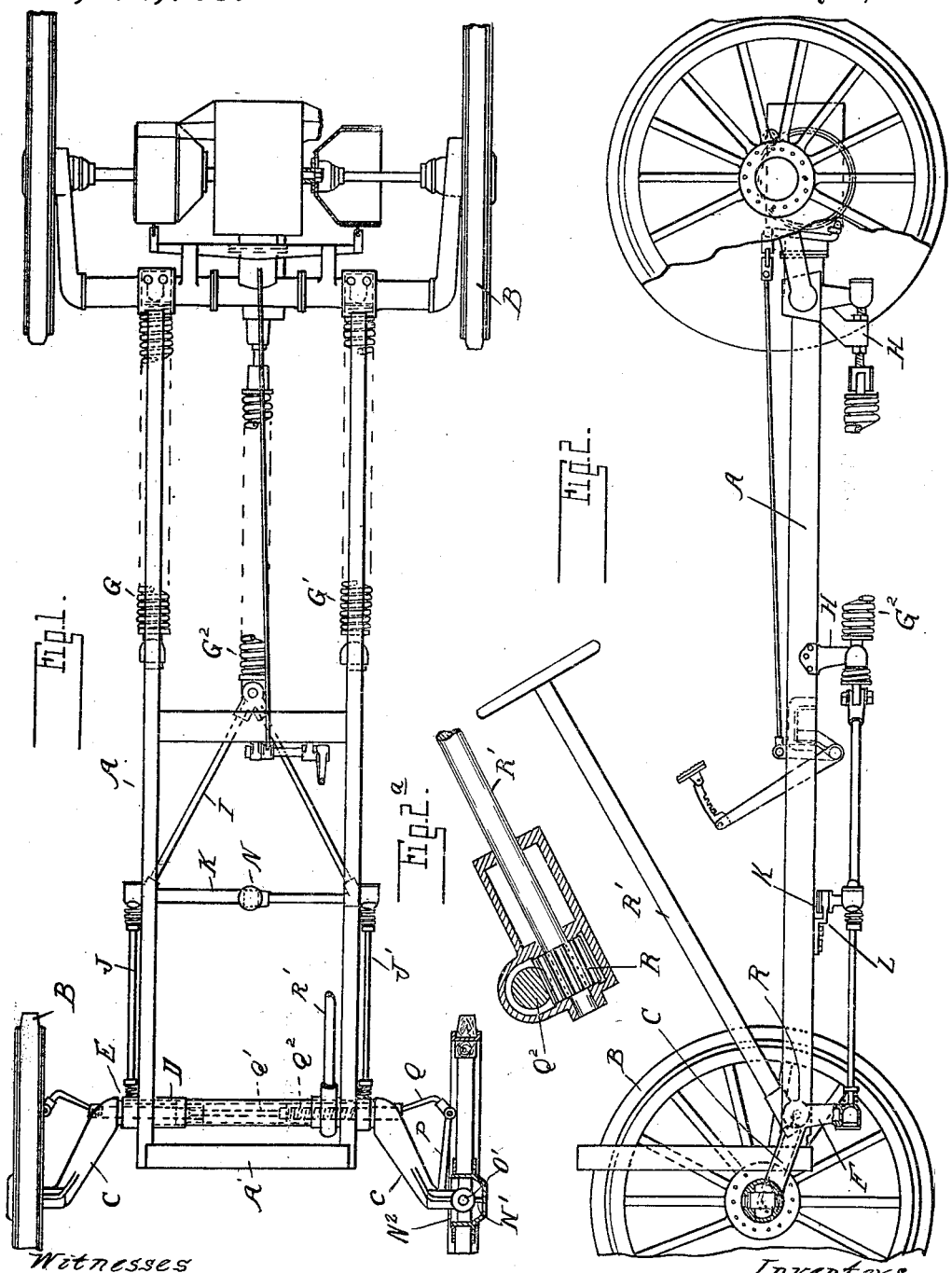

WILLIAM EMIL BOCK AND HENRY L. BOCK, OF TOLEDO, OHIO; SAID HENRY L. BOCK ASSIGNOR TO SAID WILLIAM EMIL BOCK.

RUNNING-GEAR FOR VEHICLES.

1,272,765.  Specification of Letters Patent.  Patented July 16, 1918.

Application filed June 28, 1913. Serial No. 776,457.

*To all whom it may concern:*

Be it known that we, WILLIAM EMIL BOCK and HENRY L. BOCK, citizens of the United States of America, residing at Toledo, in the county of Lucas and State of Ohio, have invented certain new and useful Improvements in Running-Gear for Vehicles, of which the following is a specification, reference being had therein to the accompanying drawings.

The invention relates to running gears for vehicles of that type in which the vehicle frame is supported upon the wheels through the medium of independently rockable, yieldable arms. Such constructions have the advantage of reducing the shocks imparted to the frame when the vehicle is traveling over a rough road, and also permit of employing springs of greater resiliency than those commonly used in vehicle gears. There are, however, various difficulties to be overcome—such for instance as interference with the steering by the independent movement of the steering wheels, and also the lack of stability due to the shifting of the center of gravity during independent movement of the wheels. The present invention is designed to overcome these and other objections, and to this end the invention consists in various features of construction as hereinafter set forth.

In the drawings:

Figure 1 is a plan view of the chassis or vehicle frame and running gear;

Fig. 2 is a side elevation thereof; and

Fig. 2ª is a section through the steering mechanism.

The frame of the machine is of any suitable construction, comprising side sills A and cross bars A'; B are the wheels; and C are the rockable arms upon which the wheels are journaled and which are mounted upon the frame by bearings D engaging journal shanks E on the arms. F are downwardly-extending rock arms secured to the shanks E, to which are attached the springs G G' and G² extending longitudinally of the frame and anchored to depending brackets H thereon. As shown and preferably constructed, the springs G and G' which are attached to the rock arms corresponding to the rear or driving wheels, are arranged beneath the side sills of the frame. The spring G² is arranged in the central plane of the frame and is connected to yieldably support the rockable arms for both of the forward wheels through the medium of an equalizing or stabilizing connection, preferably constructed as follows:

I is a draft frame, preferably of triangular form, its rear end being attached to the springs G². J and J' are rods pivotally connected to opposite sides of the frame I and at their opposite ends connected with the depending rock arms F of the rockable member C for the forward wheels. The frame I is held from lateral movement in the portion thereof which is attached to the rods J and J', preferably by means of a link K which is pivotally attached to a bracket L on one of the side sills of the frame. The free end of said link K is pivotally attached at N to the center of the forward bar of the frame I. The arrangement is such that the tension of the spring G² will normally exert an equal force upon the rods J and J', so that the main frame A will be supported yieldably upon the wheels. When, however, one of the rockable members C is moved to a greater extent than the other, as, for instance, where its wheels meet an obstruction in the road bed, or by the shifting of the weight on the frame so as to place the center of gravity nearer one side than the other, this will cause an unequal movement of the rods J and J', which will be communicated to the frame I, causing the lateral deflection of the rear end of said frame and of the spring G² attached thereto. As a result, the line of draft of said spring, instead of being parallel to the rods J and J', will be shifted so as to exert a greater tension upon one rod than the other, the maximum tension being upon the rod which is moved farthest in opposition to the spring. At the same time, the tension on the other rod J will be lessened from the normal so that the unequal forces exerted on the two rods will tend to restore the parts to normal position.

To permit of steering the vehicle, the wheels are mounted upon stub axles, which are pivotally attached to the rockable arms C, but turn upon a substantially vertical axis. Inasmuch, however, as the arms C are themselves rockable, such a movement will change the angle of the stub axle pivot, and moreover would interfere with the steering mechanism of the construction usually employed. Thus, in traveling over a rough road, it would be difficult or impossible to accurately steer the vehicle, particularly if running at high speed, for each change in the elevation of one of the steering wheels would produce an angular change in the direction of its travel. To overcome this difficulty we have provided a construction in which the steering wheels are permitted to move independently, vertically in relation to the frame without change of their respective planes of rotation. In other words, the vertical adjustment of the wheels will not effect the steering; nor will the adjustment of the steering mechanism effect the vertical movement, the construction being preferably as follows:

Each of the steering wheels is connected with its corresponding rockable arm C by a pivot connection arranged in the central plane of the wheel. Preferably the hub $N^2$ of the wheel is hollow and is provided with the central stub axle $N'$ arranged centrally thereof and preferably integral therewith. This stub axle engages a sleeve bearing (not shown) which is provided centrally with vertical pivots $O'$ engaging a bifurcated rockable arm C. The sleeve bearing has secured thereto an actuating arm P, which extends outward from the hollow hub and then laterally to a point substantially in alinement with the axis of the rockable arm C. Q are links attached to the arms P, and at their opposite ends to a steering bar $Q'$, which latter preferably extends through the hollow journals of the arm C. $Q^2$ is a rack formed on the bar $Q'$, which is engaged by a pinion R upon the steering stem $R'$, said pinion being located in an aperture or cut-away portion of the hollow journal for the rockable member C. With the arrangement just described, the rotation of the steering stem will shift the bar $Q'$, and through the connecting links Q will correspondingly rock the arms P, turning the sleeve bearing upon the pivot $O'$ and carrying therewith the stub axle $N'$ which turns the wheel. This movement is unaffected by any vertical oscillation of the wheel and rocking movement of the member C, for the reason that the point of connection between the arms P and links Q is in or near the axis of said rockable arm C. On the other hand, this movement of the steering mechanism does not interfere with the vertical oscillation of the arm C, each movement being entirely independent of and unaffected by the other.

With the construction as described in use, the vehicle can travel over rough roads with a minimum transmission of shocks to the frame, as each wheel is capable of independently rising or falling in passing obstructions. Furthermore, there is a lateral as well as a vertical cushioning effect due to the capability of each wheel to change the angle of its plane from the vertical. Thus, each time one wheel rises or falls more than the wheel on the opposite side of the vehicle, the planes of both wheels are shifted slightly from the vertical. The reverse effect is produced when a lateral stress upon the vehicle tends to incline the plane of the wheels; for such an effect is permitted by the rising of one of the rockable members C more than the other, while the unequal tensioning of the springs G G' and $G^2$ will cause the restoration of the parts to normal position. This lateral flexibility of the construction is very advantageous as it reduces strains, as well as improving the easy riding quality of the vehicle.

What we claim as our invention is:

1. A vehicle, comprising a frame, wheels, independent rock arms for supporting said frame upon said wheels, axially alined hollow shafts for connecting said rock arms with said frame, knuckles for pivotally supporting said wheels on said rock arms, actuating arms for said knuckles having ends extending in substantial alinement with the axis of said hollow shafts, a rod connecting said actuating arms extending through said hollow shaft, and means for adjusting said rod.

2. A vehicle, comprising a frame, wheels, independent rock arms for supporting said frame upon said wheels, knuckles for attaching said wheels to said rock arms, hollow shafts for said rock arms, and steering mechanism for actuating said knuckles passing through said hollow shafts.

3. A vehicle comprising a frame, a wheel, an independently yieldable rock arm for supporting said frame upon said wheel, said rock arm being journaled upon said frame, and steering mechanism for actuating said wheel passing through the journaled portion of the rock arm.

4. A vehicle, comprising a frame, wheels for supporting said frame, independently vertically yieldable in relation thereto, rock arms for said wheels, journaled upon said frame, and steering mechanism for each of said wheels permitting and unaffected by said independent vertical movement, comprising an actuating arm, a link pivotally connected to said arm in substantial alinement with the journal of the rock arm, and means for actuating said link.

5. A vehicle, comprising a frame, a wheel, a rock arm for supporting said frame upon said wheel, said rock arm being journaled upon said frame and steering mechanism for actuating said wheel provided with a pivotal connection in alinement with the journal for the rock arm.

In testimony whereof we affix our signatures in presence of two witnesses.

WILLIAM EMIL BOCK.
HENRY L. BOCK.

Witnesses:
R. F. SCHNEIDER,
A. C. BAY.

Copies of this patent may be obtained for five cents each, by addressing the "Commissioner of Patents, Washington, D. C."